US012553228B2

(12) United States Patent
Lin et al.

(10) Patent No.: US 12,553,228 B2
(45) Date of Patent: Feb. 17, 2026

(54) FLOW RATE REGULATING STRUCTURE AND BUBBLER

(71) Applicant: FUJIAN XIHE SANITARY WARE TECHNOLOGY CO., LTD., Fujian (CN)

(72) Inventors: Xiaofa Lin, Fujian (CN); Xiaoshan Lin, Fujian (CN); Zhiwei Chen, Fujian (CN); Xiaoqing Deng, Fujian (CN); Pansheng Liang, Fujian (CN); Qiqiao Liu, Fujian (CN)

(73) Assignee: FUJIAN XIHE SANITARY WARE TECHNOLOGY CO., LTD., Fujian (CN)

( * ) Notice: Subject to any disclaimer, the term of this patent is extended or adjusted under 35 U.S.C. 154(b) by 233 days.

(21) Appl. No.: 18/559,789

(22) PCT Filed: May 10, 2022

(86) PCT No.: PCT/CN2022/091964
§ 371 (c)(1),
(2) Date: Nov. 8, 2023

(87) PCT Pub. No.: WO2023/151197
PCT Pub. Date: Aug. 17, 2023

(65) Prior Publication Data
US 2024/0254743 A1    Aug. 1, 2024

(30) Foreign Application Priority Data

Feb. 14, 2022   (CN) .......................... 202210134316.4
Feb. 14, 2022   (CN) .......................... 202220293785.6

(51) Int. Cl.
*E03C 1/084*          (2006.01)
(52) U.S. Cl.
CPC .................................. *E03C 1/084* (2013.01)

(58) Field of Classification Search
CPC ........ E03C 2001/026; E03C 1/04; E03C 1/08; E03C 1/086
(Continued)

(56) References Cited

U.S. PATENT DOCUMENTS 3,684,191 A      8/1972   Shames et al.
4,313,564 A  *   2/1982   Shames .................. E03C 1/084
                                                        239/110
(Continued)

FOREIGN PATENT DOCUMENTS

CN        108505589        9/2018
CN        214033918        8/2021
(Continued)

OTHER PUBLICATIONS

"International Search Report (Form PCT/ISA/210) of PCT/CN2022/091964", mailed on Nov. 18, 2022, with English translation thereof, pp. 1-4.
(Continued)

*Primary Examiner* — Brady W Frazier
(74) *Attorney, Agent, or Firm* — JCIPRNET

(57) ABSTRACT

The disclosure discloses a flow rate regulating structure and a bubbler. The flow rate regulating structure includes a water passing member and an elastic member. The water passing member is provided with an accommodating cavity with an opening on a top and a water passing cavity opening at the bottom wall of the accommodating cavity. The periphery of the bottom wall of the water passing cavity is circumferentially provided with several water passing holes. The elastic member includes an elastic member body and a dispersing part. The periphery of the elastic member body abuts against the bottom wall of the accommodating cavity and shields the water passing cavity. The dispersing part extends from the middle of the elastic member body in a direction away from
(Continued)

the water passing cavity, and a dispersing cavity passing through the elastic member body.

13 Claims, 6 Drawing Sheets

(58) Field of Classification Search
USPC .................................................... 239/428.5
See application file for complete search history.

(56) References Cited

U.S. PATENT DOCUMENTS

| | | | | |
|---|---|---|---|---|
| 8,109,449 | B2* | 2/2012 | Weis ...................... | F16K 3/085 |
| | | | | 239/581.1 |
| 10,294,641 | B2* | 5/2019 | Stein ..................... | G05D 7/012 |
| 10,697,162 | B2* | 6/2020 | Li ............................ | B05B 1/18 |
| 11,591,780 | B2* | 2/2023 | Chen ..................... | E03C 1/0404 |
| 2003/0146302 | A1* | 8/2003 | Dieterle ................. | E03C 1/084 |
| | | | | 239/428.5 |
| 2009/0008478 | A1* | 1/2009 | Grether ................... | F16L 55/24 |
| | | | | 239/428.5 |
| 2011/0006132 | A1* | 1/2011 | Grether ................... | E03C 1/084 |
| | | | | 239/428.5 |
| 2013/0087637 | A1* | 4/2013 | Schnell ................ | E03C 1/0409 |
| | | | | 239/428.5 |
| 2017/0136476 | A1* | 5/2017 | Wu ........................ | B05B 15/40 |
| 2018/0002906 | A1* | 1/2018 | Huang ................... | E03C 1/084 |
| 2018/0080204 | A1* | 3/2018 | Norling .................... | E03C 1/08 |
| 2019/0376265 | A1* | 12/2019 | Huang .................... | B05B 1/169 |

FOREIGN PATENT DOCUMENTS

| | | |
|---|---|---|
| CN | 113446422 | 9/2021 |
| CN | 114396498 | 4/2022 |

OTHER PUBLICATIONS

"Written Opinion of the International Searching Authority (Form PCT/ISA/237) of PCT/CN2022/091964", mailed on Nov. 18, 2022, pp. 1-5.

* cited by examiner

FLOW RATE REGULATING STRUCTURE AND BUBBLER

CROSS-REFERENCE TO RELATED APPLICATION

This application is a 371 of international application of PCT application serial no. PCT/CN2022/091964, filed on May 10, 2022, which claims the priority benefit of China application no. 202210134316.4 and no. 202220293785.6, filed on Feb. 14, 2022. The entirety of each of the above-mentioned patent applications is hereby incorporated by reference herein and made a part of this specification.

TECHNICAL FIELD

The disclosure relates to the field of water outlet devices, in particular to a flow rate regulating structure and a bubbler.

DESCRIPTION OF RELATED ART

In a water outlet device, in order to maintain the stability of the flow rate under different water pressure conditions, the flow rate at different water pressures is generally adjusted by setting a flow rate regulating structure.

The existing flow rate regulating structures generally achieve the effect of flow rate regulation by impacting an elastic member through water pressure to deform the elastic member. The elastic member has only one function and does not have the function of generating micro-bubbles.

SUMMARY

The purpose of the present disclosure is to overcome the above-mentioned defects or problems in the related art, and provide a flow rate regulating structure capable of generating micro-bubbles and a bubbler having the flow rate regulating structure.

To achieve the above purpose, the present disclosure adopts the following technical solutions.

Solution 1: A flow rate regulating structure includes a water passing member and an elastic member; the water passing member is provided with an accommodating cavity with an opening on a top and a water passing cavity opening at the bottom wall of the accommodating cavity. The periphery of the bottom wall of the water passing cavity is circumferentially provided with several water passing holes. The elastic member includes an elastic member body and a dispersing part. The periphery of the elastic member body abuts against the bottom wall of the accommodating cavity and shields the water passing cavity. The dispersing part extends from the middle part of the elastic member body in a direction away from the water passing cavity, and a dispersing cavity which passes through the elastic member body and communicates with the water passing cavity is provided in the dispersing part. The top of the dispersing part is provided with a first water through hole communicating with the dispersing cavity, and at least one second water through hole communicating with the accommodating cavity and the dispersing cavity is provided on a side wall of the dispersing part. The at least one second water through hole is spaced apart from a surface of the elastic member body facing away from the water passing cavity in an extending direction of the dispersing part.

Solution 2: Based on solution 1, the side wall of the dispersing part is circumferentially provided with at least two of the at least one second water through hole.

Solution 3: Based on solution 2, the second water through holes are evenly and circumferentially arranged.

Solution 4: Based on solution 3, the elastic member is further provided with a first filter part and a second filter part. The first filter part is fixedly connected to the top of the dispersing part and covers the first water through hole. The first filter part is penetrated with a plurality of first filter holes communicating with the first water through hole. The second filter part extends radially outward from the outer wall of the dispersing part and covers an opening of the accommodating cavity. The second filter part is penetrated with a plurality of second filter holes communicating with the accommodating cavity.

Solution 5: Based on solution 4, a sealing part is formed on the periphery of the second filter part. The bottom wall of the sealing part abuts against the end surface of a top of the accommodating cavity, and the outer diameter of the sealing part is greater than or equal to the outer diameter of the end surface of the top of the accommodating cavity.

Solution 6: Based on solution 5, the middle part of the bottom wall of the water passing cavity is protruded with a spreading platform. The spreading platform includes a first protrusion, and the top of the first protrusion is provided with a spreading groove whose opening faces the dispersing cavity. The groove wall of the spreading groove is an inclined wall facing the central axis of the spreading groove.

Solution 7: Based on solution 6, the spreading platform is further provided with a first convex, and the first convex extends from the bottom wall of the spreading groove toward the direction of the dispersing cavity.

Solution 8: Based on solution 7, the bottom wall of the water passing cavity is provided with a first boss group. The first boss group is arranged near the water passing holes, and includes several first bosses and second bosses, and all of the first bosses are evenly and circumferentially arranged, and first gaps communicating with the water passing hole are formed between two of the first bosses adjacent to each other. All of the second bosses are evenly and circumferentially arranged, and are all located on the inner sides of the first bosses and respectively face the first gaps.

Solution 9: Based on solution 8, the bottom wall of the water passing cavity is also provided with a second boss group. The second boss group is located on the inner side of the first boss group, which includes several third bosses and several fourth bosses. All of the fourth bosses are evenly and circumferentially arranged, and second gaps are formed between two of the fourth bosses adjacent to each other. All of the third bosses are evenly and circumferentially arranged, and are all located on the outer sides of the fourth bosses and respectively face the second gaps.

Solution 10: Based on solution 9, the bottom wall of the water passing cavity is also provided with a third boss group. The third boss group is located between the second boss group and the first protrusion, and includes several fifth bosses evenly and circumferentially arranged.

Solution 11: A bubbler includes a bubbler body and the flow rate regulating structure described in any one of the above-mentioned solutions 1 to 10. The bubbler body is provided with a first cavity with an opening on a top. The bottom of the water passing member is placed into the first cavity and encloses along with the inner wall of the first cavity to form an air-water mixing cavity communicating with the water passing holes. The side wall of the bubbler body is penetrated with several air inlet holes communicating with the air-water mixing cavity, and the bottom wall thereof is penetrated with a plurality of water outlet holes communicating with the air-water mixing cavity.

Solution 12: Based on solution 11, a plurality of second protrusions are protruded from the bottom wall of the bubbler body.

Solution 13: Based on solution 12, the top of each of the second protrusions is a spherical surface.

As can be seen from the above description of the present disclosure, compared with the related art, the present disclosure has the following advantageous effects.

1. When the water passes through the flow rate regulating structure, part of the water flow enters the accommodating cavity from the opening of the accommodating cavity, and the other part enters the spreading cavity directly through the first water through hole of the dispersing part. Since the second water through hole is spaced apart from a surface of the elastic member body facing away from the water passing cavity in the extending direction of the dispersing part, the water entering the accommodating cavity will not directly enter the dispersing cavity through the second water through hole; instead, after water is accumulated and the pressure is built, the water sprays into the dispersing cavity from the second water through hole. The water entering the dispersing cavity from the first water through hole and the second water through hole collide with each other to generate water with micro-bubbles. The water with micro-bubbles produced by the collision enters the water passing cavity from the dispersing cavity and flows away from the water passing hole. Due to the elasticity of the elastic member, the elastic member body located between the inner wall of the accommodating cavity and the outer wall of the dispersing part forms a pressure-bearing part. In the process that water is accumulated in the accommodating cavity and the pressure is built, the pressure-bearing part is subjected to water pressure and deformed toward the bottom wall of the water passing cavity, so that the water passing area of the water passing cavity communicating with the dispersing cavity and the water passing hole is reduced. With different water pressures, the degree of deformation of the elastic member body is different; when the water pressure is low, the force on the pressure-bearing part is small, the degree of deformation is small, and the flow rate is large; when the water pressure is high, the force on the pressure-bearing part is large, the degree of deformation is large and the flow rate is small, so as to realize flow rate regulation.

2. At least two second water through holes are circumferentially arranged, so that the water flowing into the dispersing cavity from each of the second water through holes can also collide with each other, making the collision more dramatic and generating more micro-bubbles.

3. The second water through holes are evenly and circumferentially arranged, so that the stress on the pressure-bearing part is more uniform.

4. A first filter part and a second filter part are provided to filter the water entering the first water through hole and the accommodating cavity.

5. The flow rate regulating device is generally disposed in the water outlet channel of a water outlet device, and the flow rate regulating device thus needs to be tightly attached to the side wall of the water outlet channel. A sealing part is provided on the elastic member to realize sealing cooperation with the water outlet channel. The installation is easy and there is no need to provide an additional sealing ring.

6. Since the opening of the spreading groove on the first protrusion faces the dispersing cavity, when the water enters the water passing cavity from the dispersing cavity, water will collide with the inclined wall of the spreading groove, the water entering the water passing cavity will be dispersed into multiple streams to flow to each water passing hole.

7. The first convex is disposed in the spreading groove to enhance dispersion of water flow.

8. The first boss group is provided so that the water flow is dispersed by the second bosses and the first bosses in sequence in the process of water flowing to the water passing hole, and then flows from each of the first gaps to each of the water passing holes, thereby enhancing dispersion of water flow.

9. The second boss group is disposed on the inner side of the first boss group, so that the water flow will be dispersed by the fourth bosses and the third bosses in sequence in the process of water flowing to the first boss group, thereby enhancing dispersion of water flow.

10. The third boss group is disposed between the second boss group and the first protrusion, so that the water flows to the second boss group after passing through and being dispersed by the first protrusion and the third boss group in sequence, thereby enhancing dispersion of water flow.

11. The flow rate regulating structure is disposed in the bubbler body. When the water flow enters the air-water mixing cavity from the water passing holes, it is equivalent to the water flowing through a reduced flow surface. Because of the Venturi effect, the flow rate of the water flow will increase and negative pressure is generated in the air-water mixing cavity. In the meantime, external air enters the air-water mixing cavity from the air inlet hole, mixes with the water in the air-water mixing cavity to generate water with bubbles to flow out of the water outlet hole.

12. A second protrusion is set on the bottom wall of the air-water mixing cavity to further disperse the water flowing to the water outlet hole, thereby increasing the dispersion of the water flow, and the air-water mixing effect is better.

13. The top of the second protrusion is set as a spherical surface, which brings a better dispersing effect.

BRIEF DESCRIPTION OF THE DRAWINGS

In order to more clearly illustrate the technical solutions of the embodiments of the present disclosure, the following briefly introduces the drawings that need to be used in the description of the embodiments. Clearly, the drawings in the following description are some embodiments of the present disclosure. Those of ordinary skill in the art can also obtain other drawings based on these drawings on the premise of not making creative efforts.

DESCRIPTION OF THE EMBODIMENTS

Figure 1:
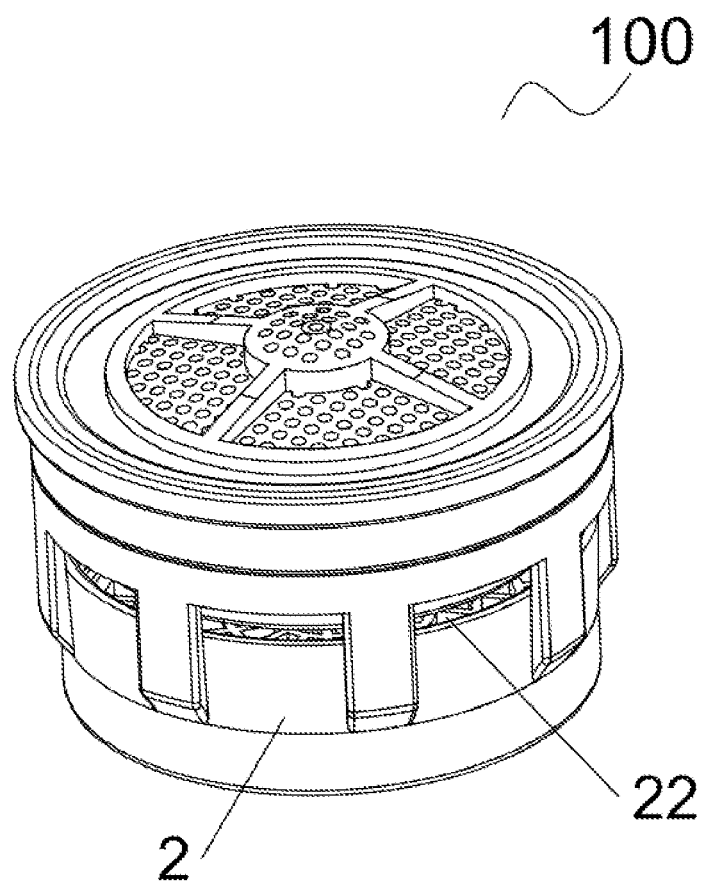
FIG. 1 is a schematic diagram of a three-dimensional structure of the bubbler in the first embodiment.

The following will clearly and completely describe the technical solutions in the embodiments of the present disclosure with reference to the drawings in the embodiments of the present disclosure. Clearly, the described embodiments are preferred embodiments of the disclosure and should not be seen as excluding other embodiments. Based on the embodiments of the present disclosure, all other embodiments obtained by persons of ordinary skill in the art without creative efforts fall within the protection scope of the present disclosure.

In the claims, specification and drawings of the present disclosure, unless otherwise clearly defined, the terms "first", "second" or "third" are used to distinguish different objects, not for describing a specific order.

In the claims, specification and drawings of the present disclosure, unless otherwise clearly defined, orientation words such as the terms "center", "transverse", "longitudinal", "horizontal", "vertical", "top", "bottom", "inner", "outer", "up", "down", "front", "back", "left", "right", "clockwise", "counterclockwise" and indicating other directions or positional relationship are used to describe the orientation and positional relationship shown in the drawings, and are only for the convenience of describing the present disclosure and simplifying the description, rather than indicating or implying that the referred device or element must have a specific orientation or be constructed and operated in a specific orientation, so it should not be construed as limiting the specific protection scope of the present disclosure.

Unless otherwise clearly defined in the claims, specification, and the above-mentioned drawings of the disclosure, if the term "fixedly connected" or "fixed connection" is used, it should be understood in a broad sense, that is, any connection method without displacement relationship and relative rotation relationship between the two, that is, including non-removable fixed connection, removably fixed connection, connected as a whole, and fixed connection through other devices or components.

In the claims, specification and drawings of the present disclosure, if the terms "comprising", "having" and their variants are used, it is intended to mean "including but not limited to".

First Embodiment

Figure 4:
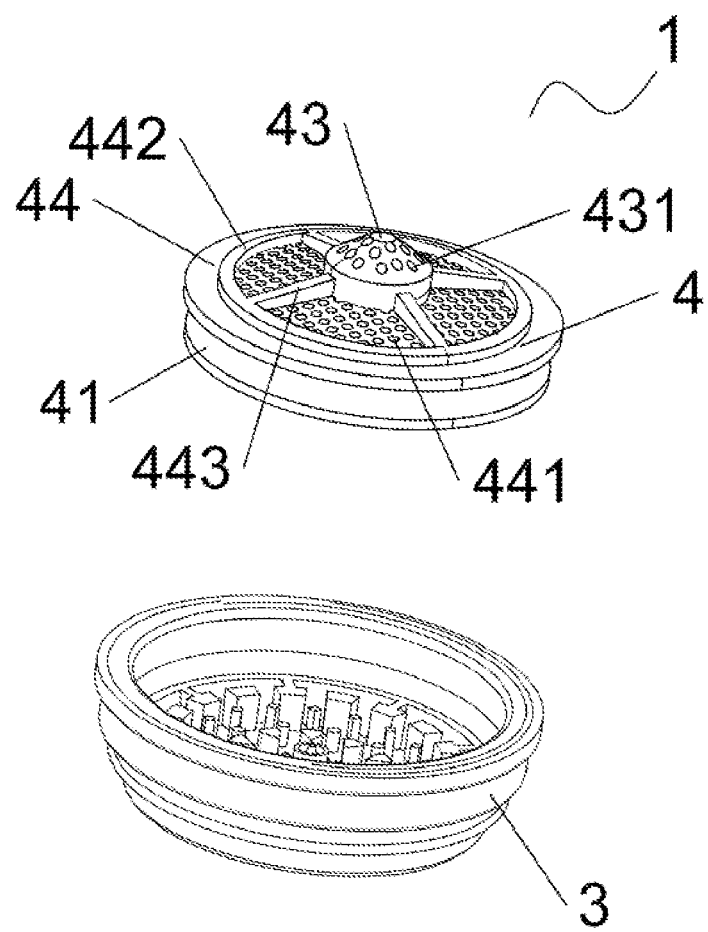
FIG. 4 is a three-dimensional exploded diagram of a flow rate regulating structure in the first embodiment.

As shown in FIG. 1 and FIG. 4, a bubbler 100 includes a flow rate regulating structure 1 and a bubbler body 2.

As shown in FIG. 4, the flow rate regulating structure 1 includes a water passing member 3 and an elastic member 4.

Figure 2:
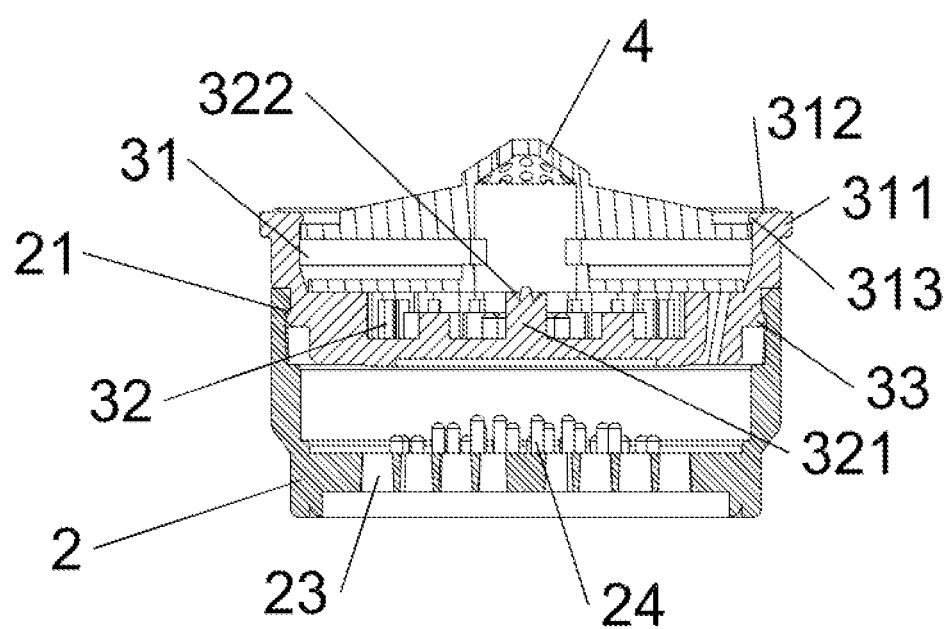
FIG. 2 is a structural schematic diagram of the first state of the bubbler in the first embodiment.
Figure 3:
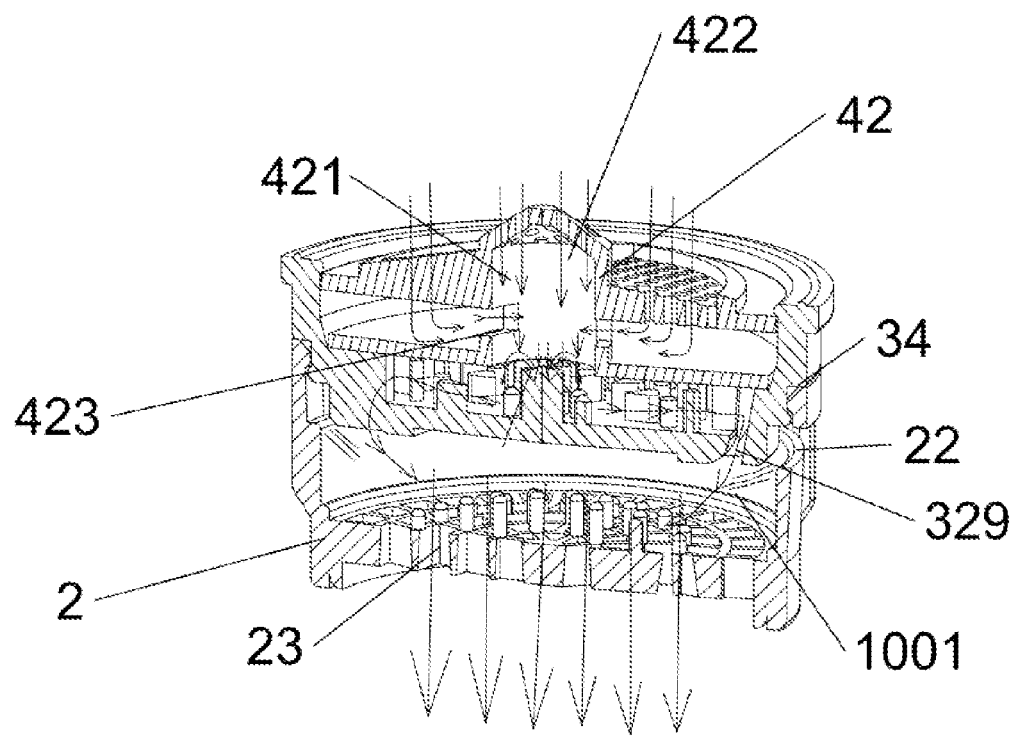
FIG. 3 is a structural schematic diagram of the second state of the bubbler in the first embodiment.

As shown in FIG. 2 to FIG. 4, the water passing member 3 is provided with an accommodating cavity 31 with an opening at the top and a water passing cavity 32 whose opening is at the bottom wall of the accommodating cavity 31. The periphery of the bottom wall of the water passing cavity 32 is circumferentially provided with several water passing holes 329. The elastic member 4 includes an elastic member body 41 and a dispersing part 42. The periphery of the elastic member body 41 abuts against the bottom wall of the accommodating cavity 31 and shields the water passing cavity 32. The dispersing part 42 extends from the middle part of the elastic member body 41 toward the direction away from the water passing cavity 32, and the inside of the dispersing part 42 is provided with a dispersing cavity 421 which penetrates through the elastic member body 41 and communicates with the water passing cavity 32. The top of the dispersing part 42 is provided with a first water through hole 422 communicating with the dispersing cavity 421, and at least one second water through hole 423 communicating with the accommodating cavity 31 and the dispersing cavity 421 is provided on the side wall of the dispersing part 42. In the extending direction of the dispersing part 42, the second water through hole 423 and a surface of the elastic member body 41 facing away from the water passing cavity 32 are spaced apart.

Specifically, as shown in FIG. 2 to FIG. 4, the water passing member 3 includes a water passing member body, and a hollow cavity with an opening on the top is provided in the water passing member body. The hollow cavity is divided into the accommodating cavity 31 and the water passing cavity 32 located below the accommodating cavity 31. A first flange 311 protrudes from the outer wall of the top of the accommodating cavity 31, and a ring-shaped second convex 312 protrudes from the top wall of the first flange 311. A ring-shaped third convex 313 protrudes from an inner wall of the top of the accommodating cavity 31. A ring-shaped fourth convex 33 and a contact surface 34 facing away from the top end surface of the water passing member body are formed on the outer side wall of the water passing member body, where the fourth convex 33 is located below the contact surface 34.

The flow rate regulating device is generally disposed in the water outlet channel of a water outlet device, and the flow rate regulating device thus needs to be tightly attached to the side wall of the water outlet channel. The second convex 312 is provided for snap-fitting with the end surface of an external sealing ring.

In actual use, as shown in FIG. 2 and FIG. 3, the side wall of the water passing cavity 32 is an inwardly tapered conical surface. The purpose of this setting is to further disperse the water flowing to the water passing hole 329 and adjust the flow direction of water. As shown in FIG. 2, the middle part of the bottom wall of the water passing cavity 32 is protruded with a spreading platform. The spreading platform includes a first protrusion 321, and the top of the first protrusion 321 is provided with a spreading groove 322 with an opening facing the dispersing cavity 421, and a groove wall of the spreading groove 322 is an inclined wall facing the central axis of the spreading groove 322, and the spreading groove 322 is in the shape of an inverted truncated cone in this embodiment.

Figure 5:
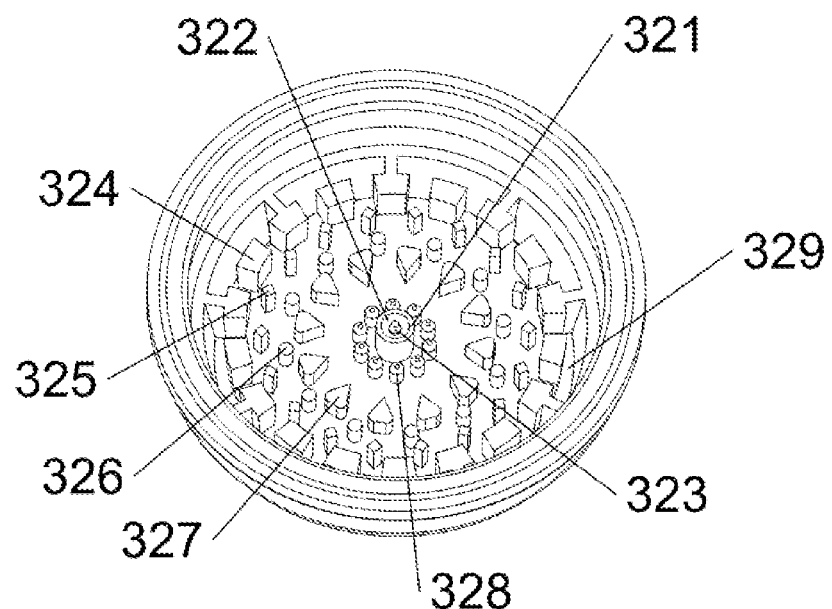
FIG. 5 is a structural schematic diagram of the first viewing angle of the water passing member in the first embodiment.

Further, as shown in FIG. 5, the spreading platform is also provided with a first convex 323, and the first convex 323 extends from the bottom wall of the spreading groove 322 towards the dispersing cavity 421, and such arrangement of the first convex 323 increases the dispersion of the water flow when the water flow hits the spreading platform. The higher the degree of dispersion, the more micro-bubbles in the water flow.

Further, the bottom wall of the water passing cavity 32 is also provided with a first boss group, a second boss group and a third boss group.

As shown in FIG. 5, the first boss group is disposed close to the water passing holes 329 and includes several first bosses 324 and second bosses 325. All the first bosses 324 are evenly and circumferentially arranged, and first gaps communicating with the water passing holes 329 are formed between two adjacent first bosses 324. All the second bosses 325 are evenly and circumferentially arranged, and are all located on the inner sides of the first bosses 324 and respectively face the first gaps. By setting the first boss group, the water flow is dispersed by the second bosses 325 and the first bosses 324 in sequence in the process of water flowing to the water passing holes 329 via the first gaps, thereby enhancing dispersion of water flow.

In this embodiment, as shown in FIG. 5, each first boss 324 is a boss with an isosceles trapezoidal cross section, and its side wall corresponding to the bottom edge of the cross section faces the side wall of the water passing cavity 32.

The top wall of each first boss 324 is located on the same plane as the bottom wall of the accommodating cavity 31, so that the area for supporting the elastic member body 41 of the elastic member 4 is increased. Each second boss 325 is a boss which has a square cross section and one ridge of each the second boss faces the first gap.

As shown in FIG. 5, the second boss group is located on the inner side of the first boss group, and includes several third bosses 326 and fourth bosses 327. All the fourth bosses 327 are evenly and circumferentially arranged, and second gaps are formed between two adjacent fourth bosses 327. All the third bosses 326 are evenly and circumferentially arranged, and are all located on the outer sides of the fourth bosses 327 and respectively face the second gaps. In this embodiment, the number of second gaps is less than the number of first gaps. The second boss group is arranged on the inner side of the first boss group, so that the water flow is dispersed by the fourth bosses 327 and the third bosses 326 in sequence in the process of water flowing to the first boss group, thereby enhancing the dispersion of water flow.

In this embodiment, as shown in FIG. 5, each third boss 326 is a cylindrical boss. Each fourth boss 327 is a boss whose cross section is substantially like water drops, and the tip of each fourth boss 327 points to the first protrusion 321. As shown in FIG. 5, the third boss group is located between the second boss group and the first protrusion 321, and includes several fifth bosses 328 evenly and circumferentially arranged. In this embodiment, each of the fifth bosses 328 includes a cylindrical segment fixedly connected to the bottom wall of the water passing cavity 32 and a truncated cone fixedly connected to the top of the cylindrical segment. The top of each of the fifth bosses 328 is arranged as a truncated cone to achieve a better dispersing effect. The third boss group is set between the second boss group and the first protrusion 321, so that after the water flows through and is dispersed by the first protrusion 321 and then flows through and is dispersed by the third boss group, the water then flows to the second boss group, thereby enhancing the dispersion of water flow. In this embodiment, after the water flows through and is dispersed by the fifth bosses 328, the water then passes through and is dispersed by the fourth bosses 327, the third bosses 326, the second bosses 325 and the first bosses 324 respectively. In actual implementation, the different shapes of the bosses are selected to cooperate with each other, so that the dispersion of water flow is enhanced. It should be understood that the shapes of the bosses are not limited to the shapes listed in this embodiment as long as the bosses can cooperate with each other to enhance the dispersion of the water flow.

As shown in FIG. 3 and FIG. 4, the elastic member 4 is further provided with a first filter part 43 and a second filter part 44. The first filter part 43 is fixed connected to the top of the dispersing part 42 and shields the first water through hole 422. The first filter part 43 is penetrated with several first filter holes 431 communicating with the first water through hole 422. The second filter part 44 extends radially outward from the outer wall of the top of the dispersing part 42 and shields the opening of the accommodating cavity 31. The second filter part 44 is penetrated with several second filter holes 441 communicating with the accommodating cavity 31.

Specifically, as shown in FIG. 2 to FIG. 4, the elastic member body 41 is a disc body adapted to the accommodating cavity 31. The upper surface of the elastic member body 41 is provided with a first annular wall extending away from the direction of the water passing cavity 32, the first annular wall forms the dispersing part 42, and its inner hole penetrates through the elastic member body 41 to form the dispersing cavity 421. The opening at the top of the first annular wall forms the first water through hole 422, and the second water through hole 423 is formed on the side wall of the first annular wall. In actual implementation, the side wall of the dispersing part 42 is circumferentially provided with at least two second water through holes 423, which are evenly and circumferentially arranged. At least two second water through holes 423 are circumferentially provided, so that the water flowing into the dispersing cavity 42 from each second water through hole 423 collides with each other, making the collision more dramatic and generating more micro-bubbles. In this embodiment, there are two second water through holes 423.

As shown in FIG. 3 and FIG. 4, the first filter part 43 includes a first body, which is in the shape of a truncated cone and has a conical cavity with an open bottom. The end surface of the bottom end of the first body is fixedly connected with the end surface of the top end of the dispersing part 42. Several first filter holes 431 penetrate through the first body.

As shown in FIG. 3 and FIG. 4, the second filter part 44 includes a second body, the second body extends radially outward from the outer wall of the dispersing part 42, the lower surface of the second body is perpendicular to the outer wall of the dispersing part 42, and the upper surface of the second body is a conical surface inclined towards the elastic member body 41. The outer diameter of the second body is adapted to the inner diameter of the accommodating cavity 31. As shown in FIG. 4, a ring-shaped fifth convex 442 protrudes from the upper surface of the second body near the periphery. The upper surface of the second body is also evenly distributed with a number of reinforcing ribs 443 extending from the outer wall of the dispersing part 42 to the fifth convex 442. In this embodiment, there are four reinforcing ribs 443, which enclose along with the fifth convex 442 to form four filter regions. The second body has second filter holes 441 penetrating through the filter regions. The fifth convex 442 and the reinforcing rib 443 are used to increase the strength of the elastic member 4.

In this embodiment, a first filter part 43 and a second filter part 44 are provided to filter the water entering the first water through hole 422 and the accommodating cavity 31.

As shown in FIG. 1 to FIG. 3, the bubbler body 2 is provided with a first cavity with an opening on the top, and the inner wall of the first cavity is provided with a position-limiting surface 21 that is snapped-fitted with the fourth convex 33. The bottom of the water passing member 3 is inserted into the first cavity and encloses along with the inner wall of the first cavity to form an air-water mixing cavity 1001 communicating with the water passing hole 329. The side wall of the bubbler body 2 is penetrated with a plurality of air inlet holes 22 communicating with the air-water mixing cavity 1001, and the bottom wall thereof is penetrated with a plurality of water outlet holes 23 communicating with the air-water mixing cavity 1001. A plurality of second protrusions 24 protrude from the bottom wall of the bubbler body 2, and the tops of the second protrusions 24 are spherical curved surfaces.

The installation process of the bubbler 100 of the present embodiment is as follows.

As shown in FIG. 1 to FIG. 5, first, the bottom of the water passing member 3 is inserted into the first cavity, so that the fourth convex 33 is snapped-fitted with the position-limiting surface 21 in the first cavity. The contact surface 34 on the water passing member 3 abuts against the top end surface of the bubbler body 2. Next, the elastic member 4 is inserted into the accommodating cavity 31, so that the elastic member body 41 of the elastic member 4 abuts against the bottom wall of the accommodating cavity 31, and the upper surface of the periphery of the second filter part 44 of the elastic member 4 is snapped-fitted with the third convex 313 on the inner wall of the water passing member body. The installation is completed.

When the bubbler 100 of the present embodiment is in use:

As shown in FIG. 1 to FIG. 5, the water filtered by the first filter part 43 enters the dispersing cavity 421 from the first water through hole 422, and the water filtered by the second filter part 44 enters the accommodating cavity 31. Since the second water through hole 423 and the surface of the elastic member body 41 facing away from the water passing cavity 32 are spaced apart in the extending direction of the dispersing part 42, the water entering the accommodating cavity 31 will not enter the dispersing cavity directly from the second water through hole 423. Instead, after the water is accumulated and the pressure is built, the water sprays into the dispersing cavity 421 from the second water through hole 423. The water entering the dispersing cavity 421 from the first water through hole 422 and the second water through holes 423 collides with each other and is dispersed, and the water entering the dispersing cavity 421 from the two second water through holes 423 can also collide with each other to generate water with micro-bubbles. The water with micro-bubbles generated by the collision enters the water passing cavity 32 from the dispersing cavity 421. Since the opening of the spreading groove 322 on the first protrusion 321 of the spreading platform faces the dispersing cavity 421, when water enters the water passing cavity 32 from the dispersing cavity 421, the water will collide with the inclined wall of the spreading groove 322 and the first convex 323 in the spreading groove 322 and the water will be dispersed to further generate micro-bubbles, and the water entering the water passing cavity 32 will be dispersed into multiple streams, which flow to each water passing hole 329.

The water that passes through and is dispersed by the spreading platform is sequentially dispersed by the fifth bosses 328, the fourth bosses 327, the third bosses 326, the second bosses 325 and the first bosses 324 for multiple times and divided into multiple streams to generate smaller micro-bubbles and flow to the water passing hole 329. When the water flows to the water passing hole 329, the water hits the side wall of the water passing cavity 32 to be further dispersed, and the water flow direction is adjusted and enters the air-water mixing cavity 1001. When the water flow enters the air-water mixing cavity 1001 from the water passing hole 329, it means that the water flows through a reduced flow surface. Because of the Venturi effect, the flow rate of the water flow will increase and negative pressure is generated in the air-water mixing cavity 1001. In the meantime, external air enters the air-water mixing cavity 1001 from the air inlet hole 22, mixes with the water in the air-water mixing cavity 1001 to generate micro-bubbles. When the bubble water with micro-bubbles flows to the water outlet hole 23, the bubble water is further dispersed by the second protrusions 24, which enhances the dispersion of the water flow and makes the air-water mixing effect better. The tops of the second protrusions 24 are set as spherical curved surfaces, so that the effect of dispersion is better, and the air-water mixing effect will be better.

Figure 6:
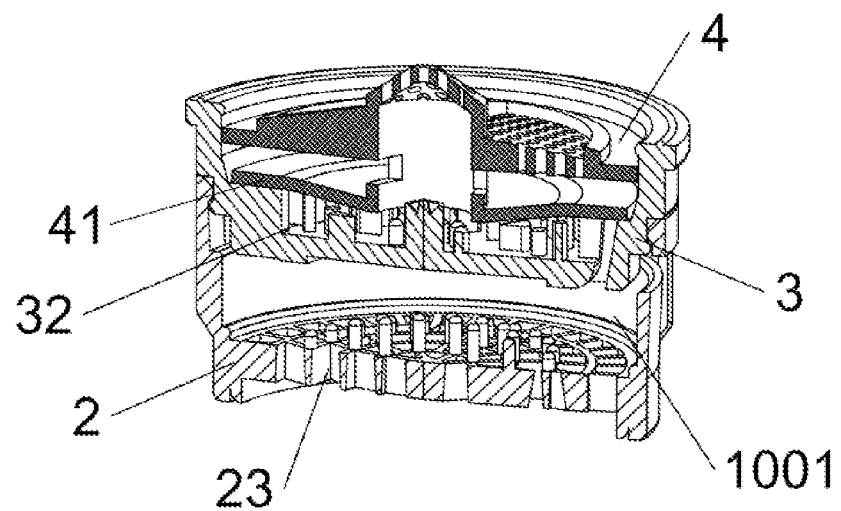
FIG. 6 is a structural schematic diagram of the third state of the bubbler in the first embodiment.

As shown in FIG. 6, when the bubbler 100 is in use, since the elastic member 4 in the flow rate regulating structure 1 has elasticity, the elastic member body 41 between the inner side wall of the accommodating cavity 31 and the outer side wall of the dispersing part 42 forms a ring-shaped pressure-bearing part. In the process of water entering the accommodation cavity 31 to accumulate and the pressure being built, the pressure-bearing part will be deformed towards the bottom wall of the water passing cavity 32 after being impacted by the water pressure, so that the water passing area of the water passing cavity 32 communicating with the dispersing cavity 421 and the water passing hole 329 is reduced. With different water pressures, the degree of deformation of the pressure-bearing part is different; when the water pressure is low, the force on the pressure-bearing part is small, the degree of deformation is small, and the flow rate is large; when the water pressure is high, the force on the pressure-bearing part is large, the degree of deformation is large and the flow rate is small, so as to realize flow rate regulation. Since the pressure-bearing part is annular, the force on the pressure-bearing part is more uniform, and the circumferential deformation is also more uniform. Moreover, the second water through holes 423 are set to be evenly and circumferentially arranged, which also helps to make the pressure-bearing part receive the force more uniformly.

Second Embodiment

Figure 7:
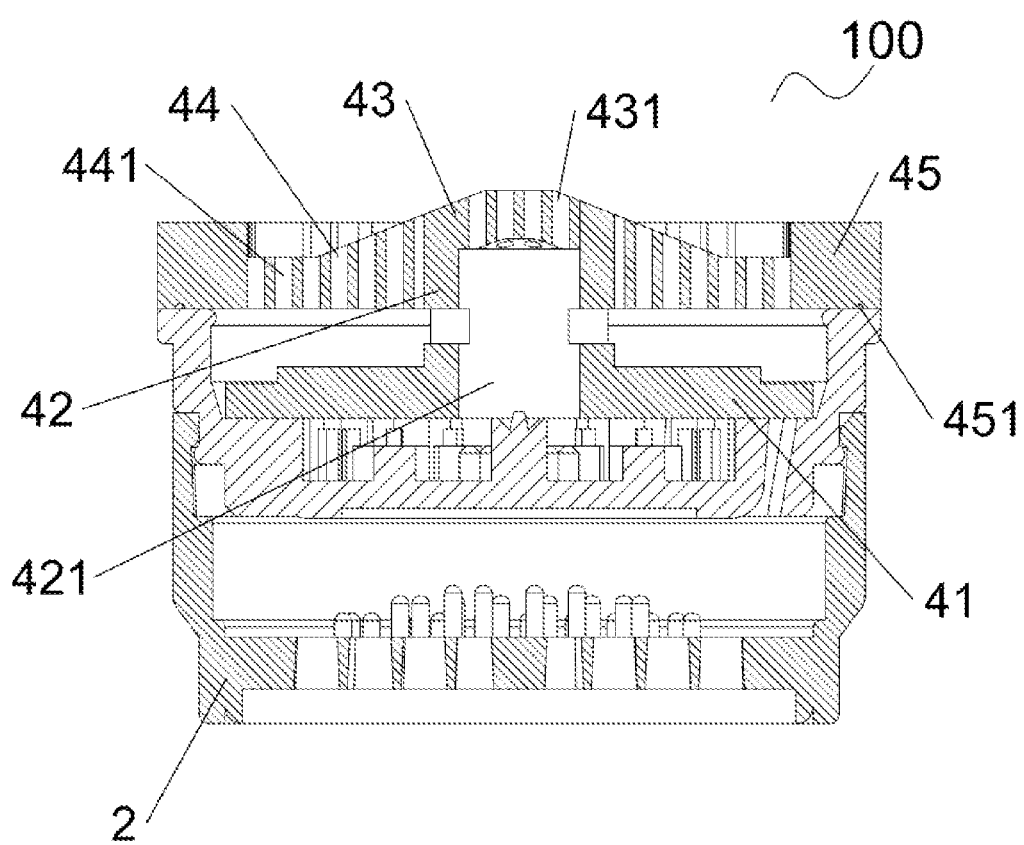
FIG. 7 is a structural schematic diagram of the bubbler in the second embodiment.

As shown in FIG. 7, this embodiment provides a bubbler 100, which differs from the first embodiment in that the structure of the elastic member 4 is different, and a sealing part 45 is formed on the periphery of the second filter part 44.

In this embodiment, as shown in FIG. 7, the elastic member body 41 of the elastic member 4 includes a first disc adapted to the inner diameter of the accommodating cavity 31 and a second disc protruding from the upper surface of the first disc. The outer diameter of the second disc is smaller than the inner diameter of the first disc, where the periphery of the lower surface of the first disc abuts against the bottom wall of the accommodating cavity 31. A second annular wall extending away from the water passing cavity 32 is provided on the upper surface of the second disc. The second annular wall forms a dispersing part 42, the inner hole of which passes through the elastic member body 41 to form a dispersing cavity 421; a second water through hole 423 is provided on the side wall of the second annular wall.

As shown in FIG. 7, the first filter part 43 includes a third body, and the third body is in the shape of a truncated cone. The bottom wall of the third body is fixedly connected to the end surface of the top of the second annular wall. A first filter hole 431 passes through the third body.

As shown in FIG. 7, the second filter part 44 includes a fourth body and the sealing part 45. The fourth body extends radially outward from the outer wall of the second annular wall; the lower surface of the fourth body is perpendicular to the outer wall of the second annular wall, and the upper surface thereof includes a conical surface smoothly connected to the upper surface of the first filter part 43 and an annular surface connected to the periphery of the conical surface. A second filter hole 441 passes through the fourth body. The sealing portion 45 is in the shape of a ring, and the inner side wall thereof is fixedly connected to the side wall of the fourth body. The lower surface of the sealing part 45 is located on the same level as the lower surface of the fourth body, and the upper surface thereof is higher than the upper surface of the periphery of the fourth body.

In this embodiment, as shown in FIG. 7, the bottom wall of the sealing part 45 is provided with a slot 451 adapted to the second convex 312 on the water passing member 3. The outer diameter of the sealing part 45 is greater than or equal to the outer diameter of the top end surface of the accommodating cavity 31. In this embodiment, the outer diameter of the sealing part 45 is equal to the outer diameter of the first flange 311.

When the bubbler 100 of this embodiment is assembled, the main difference between the present embodiment and the first embodiment is that when the elastic member 4 is placed in the accommodating cavity 31, the second filter part 44 is located outside the accommodating cavity 31, and the bottom wall of the sealing part 45 abuts against the top end surface of the accommodating cavity 31. The slot 451 on the sealing part 45 is snapped-fitted with the second convex 312.

The method of using the bubbler 100 in this embodiment is exactly the same as that in the first embodiment, and has all the advantageous effects of the first embodiment. Moreover, this embodiment is provided with a sealing part 45 that can directly cooperate with the water outlet channel in the water outlet device. The installation is easy and there is no need to set an additional sealing ring.

The descriptions of the above specifications and examples are used to explain the scope of protection of the present disclosure, but are not intended to limit the scope of protection of the present disclosure. Through the enlightenment of the present disclosure or the above-mentioned embodiments, those of ordinary skill in the art can obtain the modification, equivalent replacement or other improvements of the embodiments or some of the technical features of the disclosure through logical analysis, reasoning or limited experiments in combination with common knowledge, ordinary technical knowledge in the field and/or related art, and the modification, equivalent replacement or other improvements of the present disclosure shall all be included in the protection scope of the present disclosure.

What is claimed is:

1. A flow rate regulating structure, comprising:
   a water passing member, provided with an accommodating cavity with an opening on a top of the water passing member and a water passing cavity whose opening is at a bottom wall of the accommodating cavity; wherein a periphery of a bottom wall of the water passing cavity is circumferentially provided with a plurality of water passing holes; and
   an elastic member, comprising an elastic member body and a dispersing part; wherein a periphery of the elastic member body abuts against the bottom wall of the accommodating cavity and shields the water passing cavity; the dispersing part extends from a middle part of the elastic member body in a direction away from the water passing cavity, and a dispersing cavity passing through the elastic member body and communicating with the water passing cavity is provided in the dispersing part; a top of the dispersing part is provided with a first water through hole communicating with the dispersing cavity, and at least one second water through hole communicating with the accommodating cavity and the dispersing cavity is provided on a side wall of the dispersing part; the at least one second water through hole is spaced apart from a surface of the elastic member body facing away from the water passing cavity in the extending direction of the dispersing part.

2. The flow rate regulating structure according to claim 1, wherein the at least one second water through hole comprises at least two second water through holes, the side wall of the dispersing part is circumferentially provided with the at least two second water through holes.

3. The flow rate regulating structure according to claim 2, wherein the at least two second water through holes are evenly and circumferentially arranged.

4. The flow rate regulating structure according to claim 3, wherein the elastic member is further provided with a first filter part and a second filter part;
   the first filter part is fixedly connected to the top of the dispersing part and covers the first water through hole;
   the first filter part is penetrated with a plurality of first filter holes communicating with the first water through hole;
   the second filter part extends radially outward from an outer wall of the dispersing part and covers an opening of the accommodating cavity;
   the second filter part is penetrated with a plurality of second filter holes communicating with the accommodating cavity.

5. The flow rate regulating structure according to claim 4, wherein a sealing part is formed on a periphery of the second filter part;
   a bottom wall of the sealing part abuts against an end surface of a top of the accommodating cavity, and an outer diameter of the sealing part is greater than or equal to an outer diameter of the end surface of the top of the accommodating cavity.

6. The flow rate regulating structure according to claim 5, wherein a middle part of the bottom wall of the water passing cavity is protruded with a spreading platform;
   the spreading platform comprises a first protrusion, a top of the first protrusion is provided with a spreading groove, and an opening of the spreading groove faces the dispersing cavity; a groove wall of the spreading groove is an inclined wall facing a central axis of the spreading groove.

7. The flow rate regulating structure according to claim 6, wherein the spreading platform is further provided with a first convex, and the first convex extends from a bottom wall of the spreading groove toward the dispersing cavity.

8. The flow rate regulating structure according to claim 7, wherein the bottom wall of the water passing cavity is provided with a first boss group;
   the first boss group is arranged near the water passing holes, and comprises a plurality of first bosses and second bosses, and all of the first bosses are evenly and circumferentially arranged, and first gaps communicating with the water passing holes are formed between two of the first bosses adjacent to each other;
   all of the second bosses are evenly and circumferentially arranged, and are all located on inner sides of the first bosses and respectively face the first gaps.

9. The flow rate regulating structure according to claim 8, wherein the bottom wall of the water passing cavity is further provided with a second boss group;
   the second boss group is located on an inner side of the first boss group, and comprises a plurality of third bosses and a plurality of fourth bosses;
   all of the fourth bosses are evenly and circumferentially arranged, and second gaps are formed between two of the fourth bosses adjacent to each other;
   all of the third bosses are evenly and circumferentially arranged, and are all located on outer sides of the fourth bosses and respectively face the second gaps.

10. The flow rate regulating structure according to claim 9, wherein the bottom wall of the water passing cavity is further provided with a third boss group;

the third boss group is located between the second boss group and the first protrusion, and comprises a plurality of fifth bosses evenly and circumferentially arranged.

11. A bubbler, comprising a bubbler body and the flow rate regulating structure according to claim 1;

wherein the bubbler body is provided with a first cavity with an opening on a top;

a bottom of the water passing member is placed into the first cavity and encloses along with an inner wall of the first cavity to form an air-water mixing cavity communicating with the water passing holes;

a side wall of the bubbler body is penetrated with a plurality of air inlet holes communicating with the air-water mixing cavity, and a bottom wall of the bubbler body is penetrated with a plurality of water outlet holes communicating with the air-water mixing cavity.

12. The bubbler according to claim 11, wherein a plurality of second protrusions are protruded from the bottom wall of the bubbler body.

13. The bubbler according to claim 12, wherein a top of each of the second protrusions is a spherical surface.

\* \* \* \* \*